(12) United States Patent
Winkler et al.

(10) Patent No.: US 10,654,460 B2
(45) Date of Patent: May 19, 2020

(54) ELECTRIC DRUM BRAKE SYSTEM HAVING A RATIONALIZED ELECTRIC PARKING BRAKE ACTUATOR

(71) Applicant: Continental Teves AG & Co. oHG, Frankfurt (DE)

(72) Inventors: Thomas Winkler, Mainz (DE); Jürgen Balz, Hünstetten-Oberlibbach (DE); Marco Froschauer, Oberursel/TS. (DE); Jürgen Bauer, Wiesbaden (DE); Patrick Walter, Offenbach am Main (DE); Stefan Heinz, Eppstein (DE); Philipp Merkel, Kelkheim (DE); Pejman Bijanzadeh, Offenbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 118 days.

(21) Appl. No.: 15/774,824

(22) PCT Filed: Dec. 5, 2016

(86) PCT No.: PCT/EP2016/079726
§ 371 (c)(1),
(2) Date: May 9, 2018

(87) PCT Pub. No.: WO2017/097696
PCT Pub. Date: Jun. 15, 2017

(65) Prior Publication Data
US 2018/0345937 A1   Dec. 6, 2018

(30) Foreign Application Priority Data

Dec. 10, 2015   (DE) .................. 10 2015 224 761
Jun. 3, 2016     (DE) .................. 10 2016 209 783

(51) Int. Cl.
*F16D 65/22*    (2006.01)
*B60T 13/74*    (2006.01)
(Continued)

(52) U.S. Cl.
CPC ............ *B60T 13/741* (2013.01); *F16D 51/28* (2013.01); *F16D 65/00* (2013.01); *F16D 65/18* (2013.01);
(Continued)

(58) Field of Classification Search
CPC .......... F16D 51/10; F16D 51/28; F16D 51/22; F16D 65/00; F16D 65/18; F16D 65/22;
(Continued)

(56) References Cited

U.S. PATENT DOCUMENTS 5,053,106 A * 10/1991 Miller ................... C08J 7/12
                                                         216/99
6,321,884 B1   11/2001 Balz
(Continued)

FOREIGN PATENT DOCUMENTS

DE              812141 C      8/1951
DE       102013210528 A1     12/2014
(Continued)

OTHER PUBLICATIONS

Korean Office Action for Korean Application No. 10-2018-7016366, dated Jun. 15, 2019, with translation, 14 pages.
(Continued)

*Primary Examiner* — Thomas W Irvin
(74) *Attorney, Agent, or Firm* — RatnerPrestia

(57) ABSTRACT

A novel, particularly rationally designed, modular parking brake actuator for an electric drum brake system. An axle A1 from the motor, including a screw gear pinion coupled in a rotationally fixed manner, and an axle of the spindle arrangement, including a screw gear which is coupled in a rota-
(Continued)

tionally fixed manner to the drive nut, define under a deflection of 90° a single wheel gearbox stage of the parking brake actuator.

16 Claims, 14 Drawing Sheets

(51) Int. Cl.
| | |
|---|---|
| *F16D 65/18* | (2006.01) |
| *F16D 51/28* | (2006.01) |
| *F16D 65/00* | (2006.01) |
| *F16H 25/20* | (2006.01) |
| *F16D 121/16* | (2012.01) |
| *F16D 51/00* | (2006.01) |
| *F16D 51/22* | (2006.01) |
| *F16D 51/24* | (2006.01) |
| *F16D 121/04* | (2012.01) |
| *F16D 121/14* | (2012.01) |
| *F16D 121/24* | (2012.01) |
| *F16D 123/00* | (2012.01) |
| *F16D 125/40* | (2012.01) |
| *F16D 125/60* | (2012.01) |
| *F16D 55/225* | (2006.01) |
| *F16D 121/26* | (2012.01) |
| *F16D 127/02* | (2012.01) |
| *F16D 129/04* | (2012.01) |
| *F16D 129/10* | (2012.01) |

(52) U.S. Cl.
CPC ............. *F16D 65/22* (2013.01); *F16H 25/20* (2013.01); *F16D 51/22* (2013.01); *F16D 51/24* (2013.01); *F16D 55/225* (2013.01); *F16D 2051/006* (2013.01); *F16D 2121/04* (2013.01); *F16D 2121/14* (2013.01); *F16D 2121/16* (2013.01); *F16D 2121/24* (2013.01); *F16D 2121/26* (2013.01); *F16D 2123/00* (2013.01); *F16D 2125/40* (2013.01); *F16D 2125/60* (2013.01); *F16D 2127/02* (2013.01); *F16D 2129/04* (2013.01); *F16D 2129/10* (2013.01); *F16H 2025/209* (2013.01); *F16H 2025/2084* (2013.01)

(58) Field of Classification Search
CPC ............. F16D 2121/24; F16D 2125/40; F16D 2125/60; B60T 11/046
See application file for complete search history.

(56) References Cited

U.S. PATENT DOCUMENTS

| | | | |
|---|---|---|---|
| 8,011,482 | B2 | 9/2011 | Boyle et al. |
| 8,720,653 | B2* | 5/2014 | Han .................. B60T 7/107 |
| | | | 188/156 |
| 9,175,737 | B2 | 11/2015 | Bach et al. |
| 9,453,544 | B2* | 9/2016 | Jung .................. F16D 65/22 |
| 10,106,132 | B2 | 10/2018 | Takeo |
| 2005/0161277 | A1 | 7/2005 | Bock et al. |
| 2013/0087418 | A1 | 4/2013 | Han |
| 2014/0020997 | A1* | 1/2014 | Bach .................. F16D 51/16 |
| | | | 188/325 |
| 2014/0027221 | A1 | 1/2014 | Akada et al. |
| 2015/0345580 | A1 | 12/2015 | Jung |
| 2016/0102720 | A1 | 4/2016 | Bach et al. |
| 2019/0360542 | A1* | 11/2019 | Song .................. F16D 65/18 |
| 2019/0383391 | A1* | 12/2019 | Merwin ............. F16H 63/3466 |

FOREIGN PATENT DOCUMENTS

| | | |
|---|---|---|
| EP | 0594233 A1 | 4/1994 |
| EP | 0920390 B1 | 11/2003 |
| JP | 2005526933 A | 9/2005 |
| JP | 2008208932 A | 9/2008 |
| JP | 2015044424 A | 3/2015 |
| KR | 20130123787 A | 11/2013 |
| KR | 20130123788 A | 11/2013 |
| KR | 20140012985 A | 2/2014 |
| WO | 9845152 A1 | 10/1998 |
| WO | 2012104395 A2 | 8/2012 |

OTHER PUBLICATIONS

International Search Report and Written Opinion for International Application No. PCT/EP2016/079726, dated Mar. 1, 2017, 11 pages.

German Search Report for German Application No. 10 2016 209 783.0, dated Apr. 30, 2018, including partial English translation, 10 pages.

Japanese Notice of Reasons for Refusal for Japanese Application No. 2018-529953, dated Jul. 23, 2019 with translation, 18 pages.

Japanese Notice of Reasons for Refusal for Japanese Application No. 2018-529953, dated Jan. 6, 2020, with translation, 12 pages.

* cited by examiner

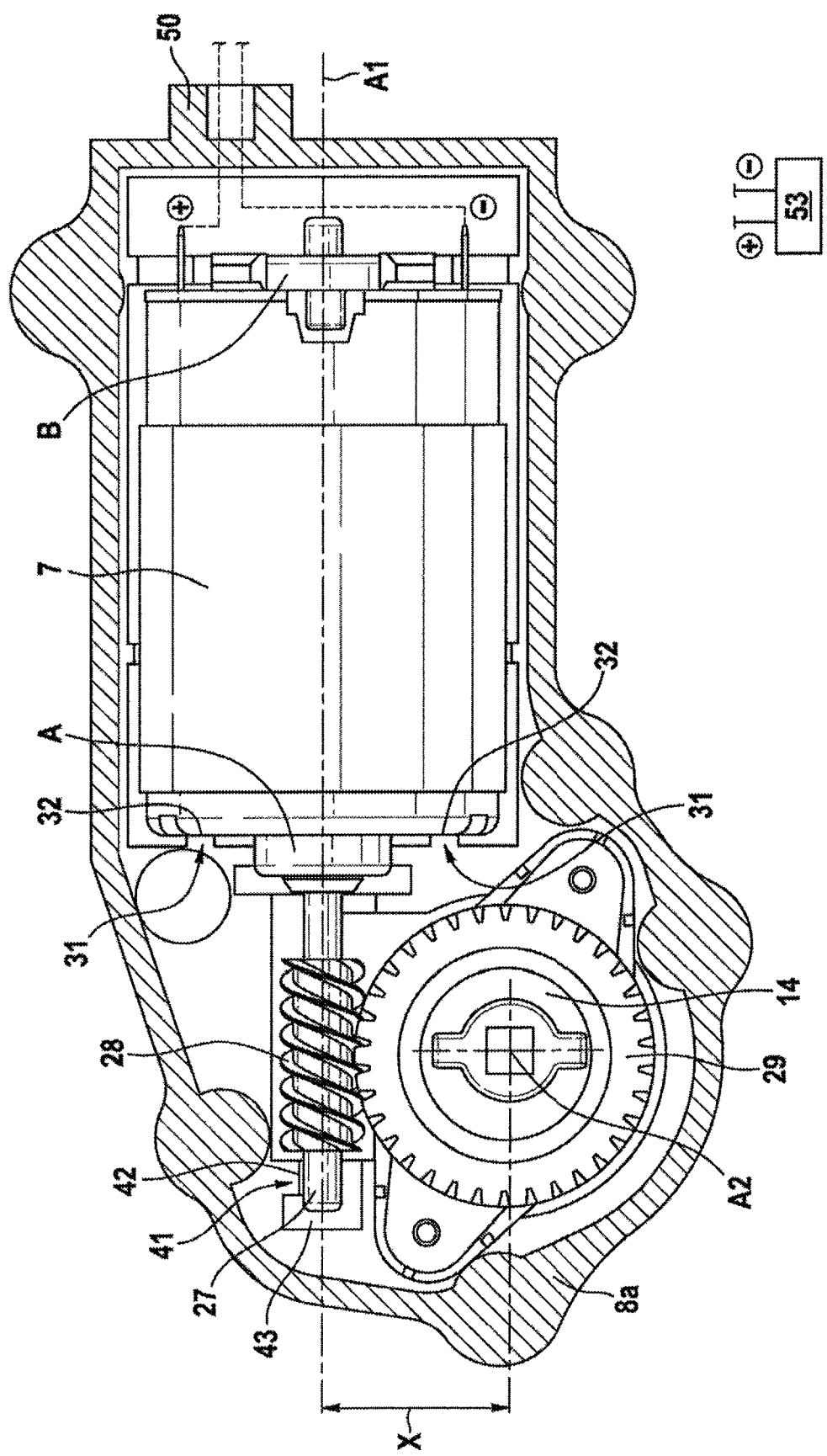

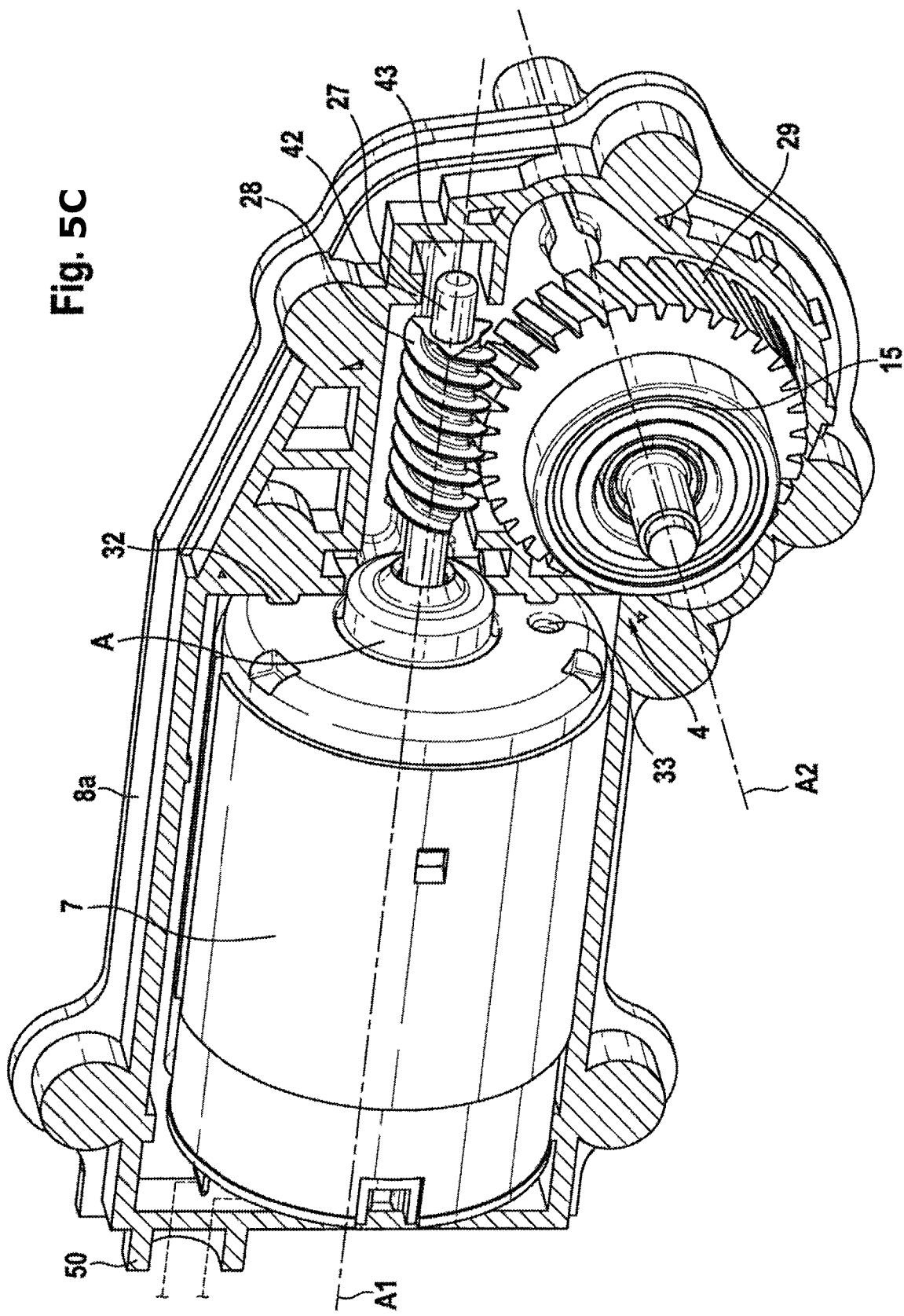

ELECTRIC DRUM BRAKE SYSTEM HAVING A RATIONALIZED ELECTRIC PARKING BRAKE ACTUATOR

CROSS REFERENCE TO RELATED APPLICATIONS

This application is the U.S. National Phase Application of PCT International Application No. PCT/EP2016/079726, filed Dec. 5, 2016, which claims priority to German Patent Application No. 10 2015 224 761.9, filed Dec. 10, 2015, and German Patent Application No. 10 2016 209 783.0, filed Jun. 3, 2016, the contents of such applications being incorporated by reference herein.

FIELD OF THE INVENTION

The present invention relates to a drum brake system with electric parking brake actuator for a motor vehicle, wherein the parking brake actuator is arranged on an outer side of an anchor plate and, in a state of rotational drive, drives a drive nut which is supported rotatably and axially fixedly on the anchor plate, which drive nut drives a spindle, which is mounted in a rotationally secured and axially displaceable manner in a gearing housing and which engages by means of an actuation cable on at least one brake shoe such that the latter can perform an actuation movement in the direction of a brake drum or can perform a release movement in the opposite direction, and having at least one electrical interface for an electrical switch and/or for an electronic control unit.

BACKGROUND OF THE INVENTION

A correspondingly generic drum brake system is known from U.S. Pat. No. 9,175,737 B1, which is incorporated by reference. EP 0 920 390 B1, which is incorporated by reference, has disclosed an electromechanically actuatable drum brake module with a particularly small overall structural size. Here, an outer circumference of a cylindrical actuation unit is inserted through an opening of an anchor plate. A rotatable drive nut is supported via the motor housing on a carrier plate. To shorten the structural length of the actuation unit, it is provided that a rotor of a specially designed electric motor engages radially around the outside of a spindle arrangement and guides said spindle arrangement in a rotationally fixed manner. This type of construction requires a relatively powerfully dimensioned electric motor with a special housing and with a specially adapted carrier plate.

An electromechanically actuatable dual-servo drum brake without cable pull articulation is known from EP 594 233 B1, which is incorporated by reference. Here, an electric motor is arranged on a rear side of an anchor plate. The motor axis is arranged at right angles with respect to an axis of rotation of a brake drum, and drives a threaded spindle which is positioned so as to be rotatable and axially non-displaceable. The threaded spindle is provided, parallel to the motor axis, in the brake drum, and is mounted in a housing. The threaded spindle is in engagement with an element which is mounted in axially displaceable and non-rotatable fashion in the housing, which element acts on a lever mechanism. This type of construction requires not only a relatively powerfully dimensioned electric motor but also further, very specifically designed components, and therefore does not permit easy variation in a mass production context. Hot stoppages are not possible without problems.

U.S. Pat. No. 6,321,884 B1, which is incorporated by reference, defines, in the case of the example of a drum brake system with electric parking brake, an electric method for actuation or release. Here, an electronic control unit serves for electrical modulation during the activation of the parking brake actuator. The electric modulation specifically includes targeted electrical energization and interruption of electrical energization, wherein this modulation must be performed repeatedly if necessary during the ongoing process.

U.S. Pat. No. 8,011,482 B2, which is incorporated by reference, discloses a drum-in-hat drum brake module (DIH) with electric actuation, similar to EP 594 233 B1, the parking brake actuator unit of which comprises a spring element which, in the actuated state, provides a follow-up force in order to provide an additional travel for a tension rod if a brake shoe co-rotation movement occurs.

DE 812 141 C, which is incorporated by reference, discloses a worm gearing.

SUMMARY OF THE INVENTION

The present invention is based on the aspect of offering an alternative, more efficient electric drum brake system which, while exhibiting high brake application forces, avoids the disadvantages of the prior art and nevertheless permits a rationalized construction with simplified assembly of the components.

According to an aspect of the invention, an axis A1 through a motor shaft of the motor including helical wheel pinion coupled rotationally conjointly to the free motor shaft end and an axis A2 of the spindle arrangement including helical wheel coupled rotationally conjointly to the drive nut are arranged approximately at right angles with respect to one another, such that a single multi-wheel gearing stage of the parking brake actuator is defined. By means of remarkably simple and stringent modular division into pre-joined assemblies, specifically a (drive) axis A1 and an (output) axis A2, it is possible, in a particularly pioneering and surprising simplification, to dispense with multiple spur-wheel gearing (stages) that have to be aligned with one another in a highly precise manner. According to an aspect of the invention, the highly accurate mounting of rotating spur-wheel gearing shafts is rationalized, and the requirement for gearing wheels is minimized. A parking brake actuator arrangement designed according to an aspect of the invention with a single-stage helical-wheel gearing is advantageously particularly resistant to breakage and also robust with respect to axle bending induced by high loads in the increased number of load cycles of modern electromechanical parking brakes. Very incidentally, a comfortably dampened noise emission characteristic is additionally achieved, with high durability and simple assembly and self-locking in an electrically deenergized state.

A physically particularly expedient interface configuration for expedient component assembly with regard to the anchor plate orientation on the motor vehicle is realized if the axis A1 of the motor is, in the installed position, arranged so as to be oriented vertically and at right angles with respect to a wheel axis of rotation D. Here, the free motor shaft end should be arranged with the helical wheel pinion (with cylindrical or globoid toothing, for example) vertically downward (that is to say toward the ground), and a free end of the motor dome should be oriented vertically upward counter to the direction of gravitational force (away from the ground). This permits a particularly weather-resistant design with automatic condensate run-off and wherein even automatic lubricant collection in the region of the tooth meshing point of the helical-wheel gearing is made possible. Conversely, this configuration makes it possible for undesired contamination of the motor interior space (sensitive air gap between permanent magnets and electrical coils) or of the commutator/carbon brush apparatus by any foreign media or lubricant to be prevented without additional features. It is made possible for a lubricant fill quantity to be reduced to the minimum that is absolutely necessary. In addition to the concentration of all electrical interfaces in the region of the free end of the motor dome, it is basically recommended that carbon brushes be arranged on the bearing shield of the B-bearing (floating bearing) on the free end of the motor dome—that is to say cooperate, in a particularly well-protected manner, with the commutator fixed to the shaft.

If the gearing housing has a liquid-impermeable and gas-permeable diaphragm between the interior space and the surrounding atmosphere, a pressure gradient between the interior space and surrounding atmosphere is avoided. In particular, the diaphragm permits a pneumatic pressure equalization as a countermeasure for a translational pumping movement of the spindle. Accordingly, an undesired contamination of the interior space by ingressing constituents of an unsuitable surrounding atmosphere (disruptive particles, disruptive fluid or mixtures thereof) is prevented.

Furthermore, an aspect of the invention also permits a structural-space-saving and at the same time individual, efficient application in the case of different wheel brake configurations by virtue of the fact that the axis A2 can be positioned at an oblique angle with respect to the wheel axis of rotation D and also in a skewed manner with respect to the anchor plate, and wherein the actuation cable is diverted in curved fashion along a three-dimensional curve R at least on the inner side of the anchor plate and is arranged so as to be led horizontally.

The gearing housing is constructed in a rational manner from two pieces composed of plastics material, wherein a special adapter may be provided as an interface with respect to the anchor plate. The gearing housing comprises, on the one hand, a trough-like gearing housing lower shell with an interface with respect to the anchor plate, and an elevated motor dome for the purposes of accommodating the motor, including electrical interface. The gearing housing is completed by the gearing housing cover, which is mounted in a rotationally rigid manner, with a pronounced gearing dome formed integrally thereon for the purposes of guiding the spindle arrangement, the axes A1, A2 of which are arranged substantially at right angles with respect to one another and so as to be offset with respect to one another with an axis spacing X.

Added value is provided for the vehicle manufacturer if all interfaces for hydraulic pipelines and cabling are, as it were, provided so as to be concentrated in a bundled manner in one sector above the wheel axis of rotation (between the 9 o'clock position and 3 o'clock position of the anchor plate). In a further concentrated embodiment, said interface concentration may be provided so as to be bundled in a particularly well-protected manner between the 12 o'clock position and the 3 o'clock position of the anchor plate. The line layout (hydraulic and electrical) may likewise be configured in bundled fashion.

In conjunction with a freely projecting, "cantilevered" mounting of the helical wheel pinion on the free motor shaft end, a particularly efficient interface configuration between and assembly of components involved is obtained on the basis of the motor shaft mounting in the motor housing and gearing housing, which rationalizes the outlay in terms of construction. In other words, transverse force components from the helical wheel toothing are accommodated not directly via a shaft mounting in the gearing housing but rather via the motor shaft mounting (proportional bearing force splitting between A/B-bearing) and the indirect or direct receiving of the motor housing in the motor dome. Here, a motor centering receptacle may engage indirectly or directly on the motor via a motor pot base or via a metallic bearing, bearing plate or a bulkhead, bearing frame or similar component, even on the basis of any desired combination and interaction of the stated features. Purely by way of example, a bearing (outer) ring of the A-bearing (fixed bearing, preferably of rolling bearing design) is received in an integral bearing seat of the pot base of the motor housing. The axially directed thrust forces from the helical wheel toothing, which act significantly on the motor shaft during actuation of the parking brake and possibly in the presence of electrically deenergized self-locking, are introduced, in the force flow via helical wheel pinion, motor shaft, A-bearing and the motor housing, into the gearing housing lower shell primarily in the region of the free end of the motor dome by axial abutment.

In a variation of these embodiments, it is possible for an A-bearing to be arranged so as to project from the motor shaft at the outside on the motor and at the output side, and wherein the bearing outer ring of said A-bearing is received and fixed in centered fashion in a fixed seat in a receptacle of the gearing housing, such that forces (longitudinal and transverse forces) from the helical wheel gearing can be introduced centrally and directly via the A-bearing into the gearing housing. It is furthermore possible, but not imperative, for the motor housing, in the form of a pot base or bearing plate, to be equipped with a centring collar for the purposes of cooperating with the outer ring of the A-bearing. The centring and fixed mounting between motor shaft and gearing housing is thus realized by means of the A-bearing, and the B-bearing is, as a floating bearing, responsible for the transmission of transverse forces.

BRIEF DESCRIPTION OF THE DRAWINGS

In the drawing, in part schematically and in part on different scales or in different sections, views or perspectives:

FIGS. 5A-5C show views of the single multi-wheel gearing stage of the parking brake actuator (helical-wheel gearing stage)

DETAILED DESCRIPTION OF THE PREFERRED EMBODIMENTS

Figure 1:
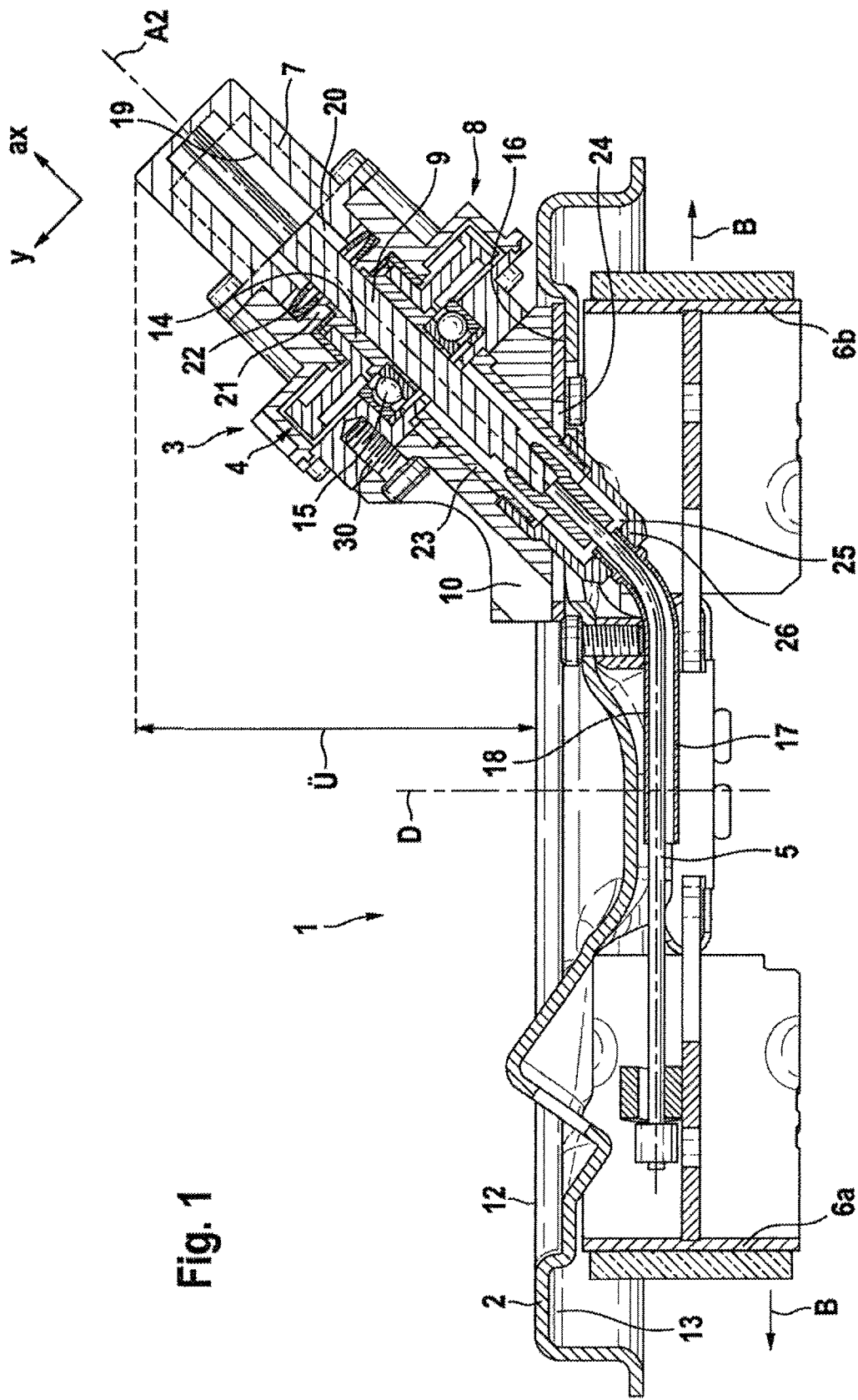
FIG. 1 shows, for the purposes of general explanation, a known electromechanical drum brake actuator arrangement as per WO2012/104395 A1 (incorporated by reference)

A known drum brake module 1, which can be actuated by electric motor, for arrangement on axle components of a motor vehicle comprises, as per FIG. 1, an anchor plate 2 with brake shoes 6a,b mounted thereon, which brake shoes are provided within a brake drum (not shown) on an inner side 13. On an opposite side (outer side 12) of the anchor plate 2, there is fastened a parking brake actuator 3 which is driven by electric motor and which, via a gearing 4 and a downstream actuation cable 5, engages on one or more brake shoes 6a,b such that said brake shoe(s) 6a,b can perform an actuation movement B in the direction of the brake drum in order to perform a service and/or parking brake function. The gearing 4 comprises a gearing housing 8 which receives or bears the motor 7 (concealed in the drawing by the spindle arrangement 9). The motor 7 consumes direct-current voltage, is mechanically or electronically commutated, and is of an inexpensively available standard type.

FIG. 1 shows an axis A1 of the motor 7 set back, by the axis spacing X, into the drawing background, that is to say parallel to and congruently behind the axis A2 of the spindle arrangement 9 (in the drawing foreground). The axis A2 with the spindle arrangement 9 constitutes, in effect, the output of the drive train. Between the parking brake actuator 3 and anchor plate 2, there is provided an adapter 10 for permitting easy coordination with and adaptation to different spatial and installation conditions in a motor vehicle. The adapter 10 is an integral constituent part of the gearing housing 8, or is a separate component. A further special feature consists in that the parking brake actuator 3 is arranged at an angle counter to the forward direction of travel of a vehicle, that is to say behind a wheel hub in relation to the forward direction of travel, approximately in a 3 o'clock position relative to the wheel hub, and tightly against the anchor plate 2. This yields particularly good protection of the parking brake actuator 3 against environmental influences such as weathering and stone impact. The small structural length of the parking brake actuator with a small projecting length Ü (owing to the parallelism of the axes A1, A2) and the flexibility of the actuation cable 5 basically permit freely adaptable placement on the anchor plate 2.

The drive and gearing train as per FIG. 1 includes a multi-stage, in particular 2-stage, toothed-wheel gearing as a torque converter of a speed reduction type. Here, the two-stage multi-wheel gearing permits a speed reduction ratio in a range between approximately 7:1 and 25:1. If the downstream lever mechanism in the region of the brake shoes 6a,b permits a speed reduction of approximately 5:1, a speed reduction ratio of approximately 125:1 is achieved.

There is furthermore also an additional speed reduction action of the rotation-translation converter, which permits an overall speed reduction action across the entire drivetrain of an order of magnitude of at least approximately 250:1. By means of this gearing train, the cost and power demands on the motor 7 are additionally considerably lowered.

The parking brake actuator 3 is in this case provided as a separately handleable structural unit on one side 12 of the anchor plate 2. It is possible for the rotation-translation converter to be integrated as a spindle arrangement 9 into the gearing housing 8 and to be guided in rotationally fixed, free-moving and play-free fashion in the gearing housing.

The gearing housing 8 is of multi-part construction. The gearing housing 8 accommodates a multiplicity of gearing components which serve primarily for torque conversion (low input torque, high output torque), and which can also permit an electrically deenergized parking brake function by means of self-locking. Axes A1, A2 of motor and gearing shafts are provided so as to be congruently parallel with respect to one another, offset by the axis spacing X. At least certain gearing structural elements may at least partially have inexpensive plastics material. Electrically deenergized self-locking is preferably provided in the rotation-translation converter (spindle arrangement 9), such that the rest of the gearing train is, in principle, substantially relieved of the brake application forces.

As per FIG. 1, the gearing housing 8 at least partially additionally accommodates a rotation-translation converter assembly with the spindle arrangement 9 for converting the rotational drive movement into a translational output movement. Consequently, the converter is, for a space-saving integration into the known drum brake arrangements, inserted in inexpensive and space-saving (compact) fashion in an interface between parking brake actuator 3 and anchor plate 2, and is nevertheless guided in the gearing housing, such that, for a conversion to the electromechanical parking brake actuator arrangement, no changes whatsoever are required to the drum brake mechanism, in particular to the lever mechanism or to the anchor plate 2.

The force flow of the brake actuation force is, as illustrated in FIG. 1, as follows. Proceeding from brake shoes 6a,b and actuation cable 5, the tension force passes via spindle arrangement 9, drive nut 14 and bearing 15 into the anchor plate 2. The bearing 15 is advantageously designed as a low-friction rolling bearing (angular-contact bearing, shoulder bearing, axial bearing or deep-groove ball bearing). The described bearing 15 also permits a radially directed mounting for the drive nut 14. In a modification of the design, for particularly precise, tilt-resistant support of the drive nut 14, in each case one drive-side and additionally one output-side bearing may be provided without departing from an aspect of the invention.

A guide 17 and a diversion of the actuation cable 5 is of substantially friction-free form through the provision of a lubricant coating and/or carefully rounded laying of the actuation cable 5 with or without a sheath 18. Here, a sealing measure must be coordinated with the physical construction of the actuation cable 5, with or without a sheath 18.

The spindle arrangement 9 is in engagement with the drive nut 14, and is positioned so as to be guided in rotationally fixed and axially displaceable fashion in the gearing housing 8. For this purpose, a gearing housing cover of the gearing housing 8 has a prismatic or cylindrical guide 19 with at least one or more adapted sliding-block elements which, as means with a positively locking action, contribute to the guidance and rotational fixing function. To permit an expedient electrical deactivation of the parking brake actuator 3, the spindle arrangement 9 is equipped with a stop 20 which serves for abutment against a housing-side counterbearing 21. Furthermore, at least one elastic element 22 is provided between counterbearing 21 and stop 20. The elastic element 22 is preferably formed as a plate spring arrangement, which makes it possible to realize a rigid spring characteristic curve with a small space requirement. This, in conjunction with measurement and observation of the electrical current demand of the motor 7, permits an expedient and early automatic electrical deactivation by means of the control unit 53.

The particularly compact parking brake actuator design includes that the spindle arrangement 9 is accommodated in displaceably guided fashion at least partially in a connector 23 of the gearing housing 8. The connector 23 is arranged in centered fashion in relation to a passage opening 24 of the anchor plate 2. The connector 23 preferably engages through the passage opening 24 such that at least a part of the spindle arrangement 9 can be displaced into the interior of the brake drum. This also serves for automatic centering of the actuation cable 5.

The parking brake actuator 3 is fully protected against the ingress of foreign media (dirt, abraded material, liquid) or the escape of introduced lubricant). For this purpose, for the sealing of the gearing housing 8, at least one seal element 26 is provided in the region of an outlet opening 25 of the actuation cable 5.

The discussion below is restricted to the description of the differences of the present invention. Features that substantially correspond to FIG. 1 are denoted in the other figures by corresponding reference designations.

Figure 2:
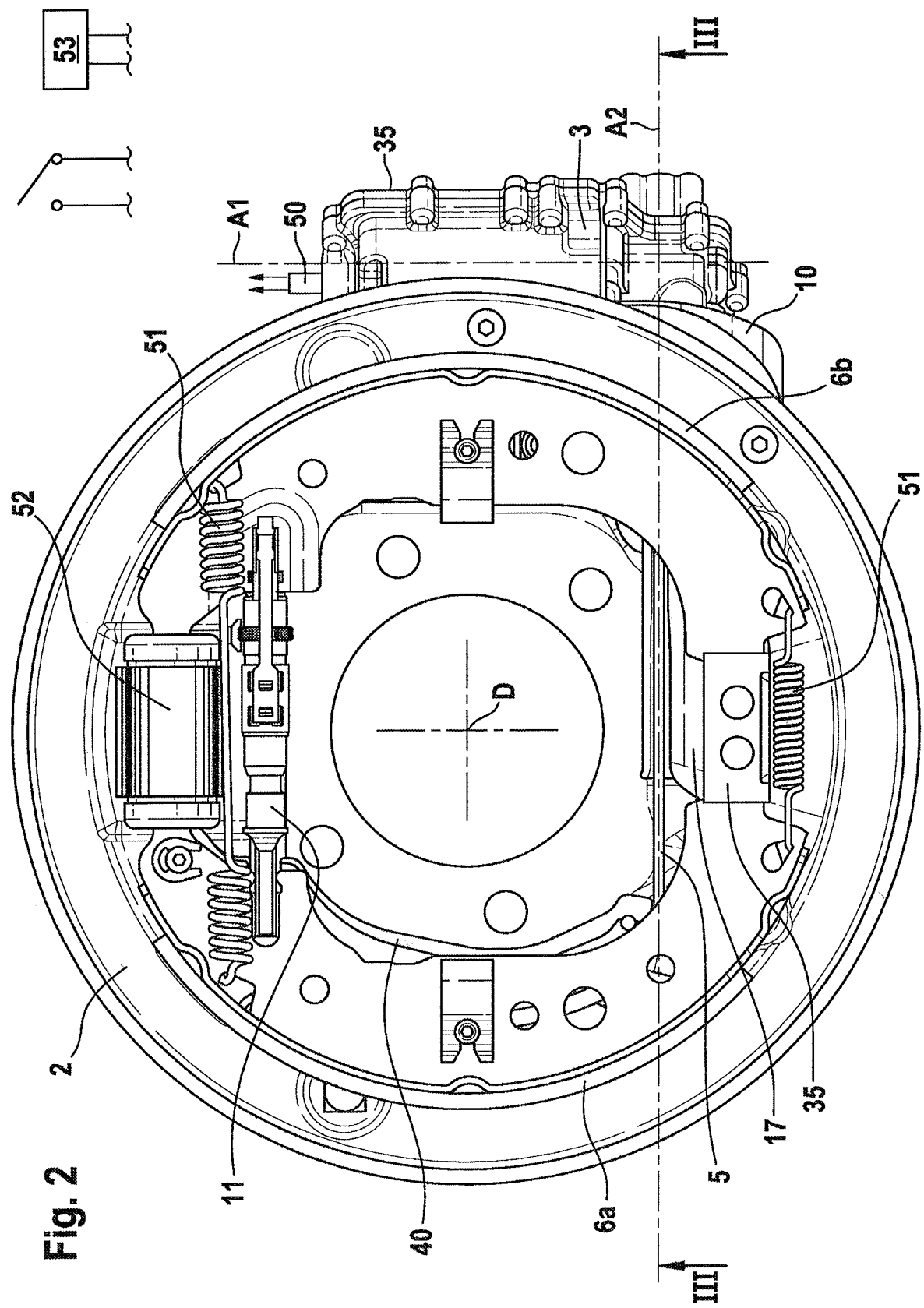
FIG. 2 shows a drum brake system according to an aspect of the invention, approximately to scale, from the inside.

As is clear from FIG. 2, the drum brake system that is actuatable in combined fashion interprets both service brake demands made by means of the wheel brake cylinder 52 and also parking brake demands that are made by means of the electromechanical parking brake actuator arrangement. Here, the service brake function is transmitted by the hydraulic wheel brake cylinder 52 directly to both brake shoes 6a,b, the release position of which in relation to a brake rotor (brake drum) (not illustrated) is defined on the one hand by the telescopable support device 11 and on the other hand by a support block 35, and wherein spring elements 51 basically preload the brake shoes 6a,b toward one another. The parking brake function, including electrically deenergized self-locking, is imparted to the brake shoes 6a,b via a lever arm 40 by the parking brake actuator 3. The parking brake actuator 3 is positioned on the outer side 12 on the anchor plate 2.

FIGS. 4-8 show the movable tract, which is divided in modular fashion into only two subassemblies, of the gearing 4, which at the drive side comprises the axis A1 including motor 7, the free motor shaft end 27 and the rotationally fixedly attached helical-wheel pinion 28. The output side is dominated by an axis A2 of the spindle arrangement 9 (of the output). For diversion purposes, said axis is arranged so as to be offset at substantially right angles (490°) with respect to, and with a defined axis spacing X to, the axis A1. Accordingly, an aspect of the present invention rationalizes previously known planetary and spur-wheel gearing actuator arrangements which require highly precisely designed and toleranced tooth meshing points on the microscopic scale, including highly precisely toleranced (gearing housing) axis spacings between axes that are oriented parallel to one another. Rather, a single simple, single-stage helical-wheel gearing stage is defined, the axis A1 of which is oriented vertically, that is to say orthogonally with respect to the wheel axis of rotation D. By contrast, the axis A2 is oriented obliquely with respect to the wheel axis of rotation D, and wherein the actuation cable 5 may be diverted in curved fashion along a three-dimensional curve R at least on the inner side 13 of the anchor plate 2 and may otherwise be arranged so as to be led substantially horizontally.

Figure 3:
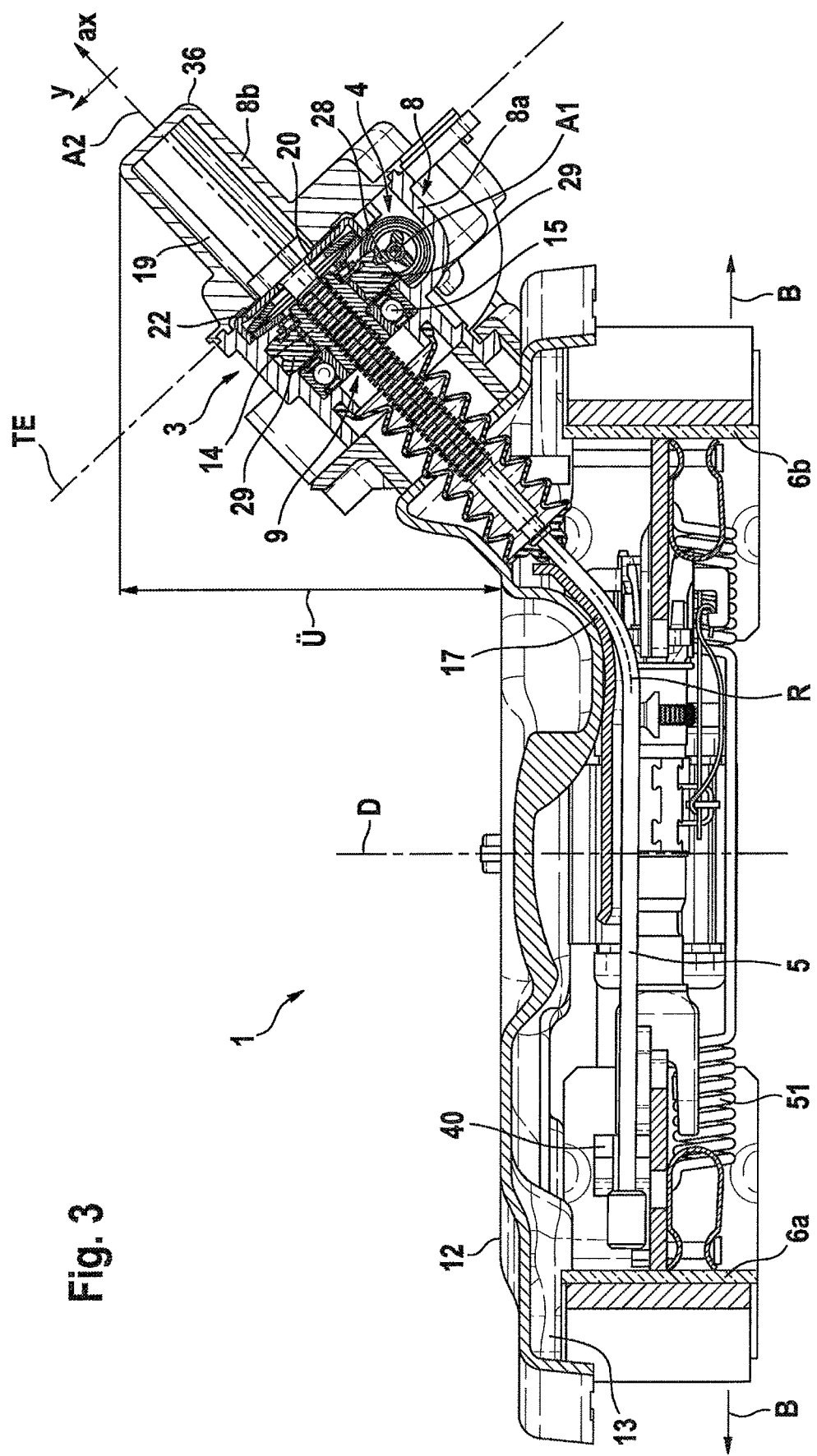
FIG. 3 shows an enlarged section along the line in FIG. 2.
Figure 4:
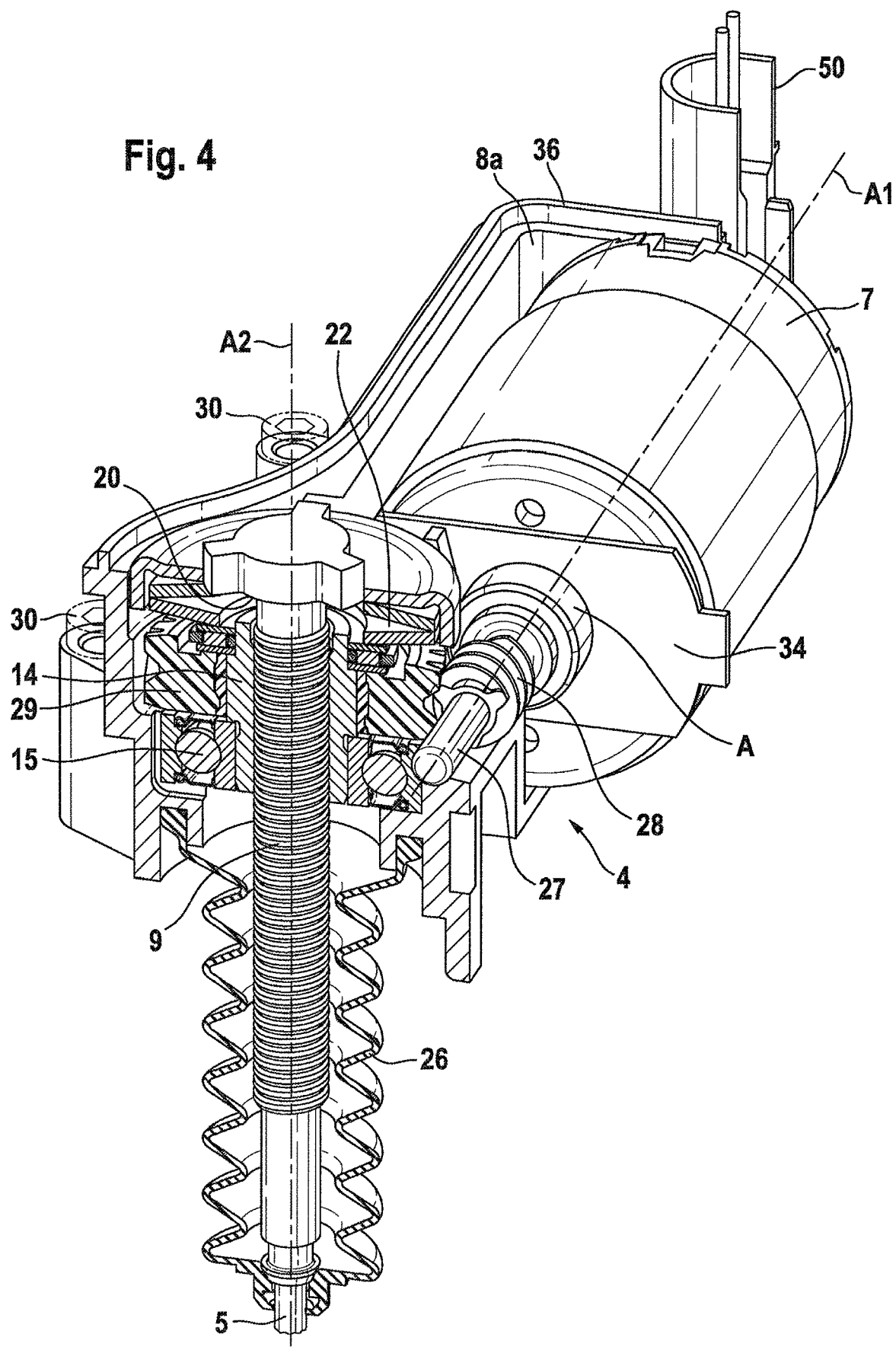
FIG. 4 shows a perspective and partially cut-away and enlarged view of a drive train of the electromechanical parking brake actuator arrangement.
Figure 5A:
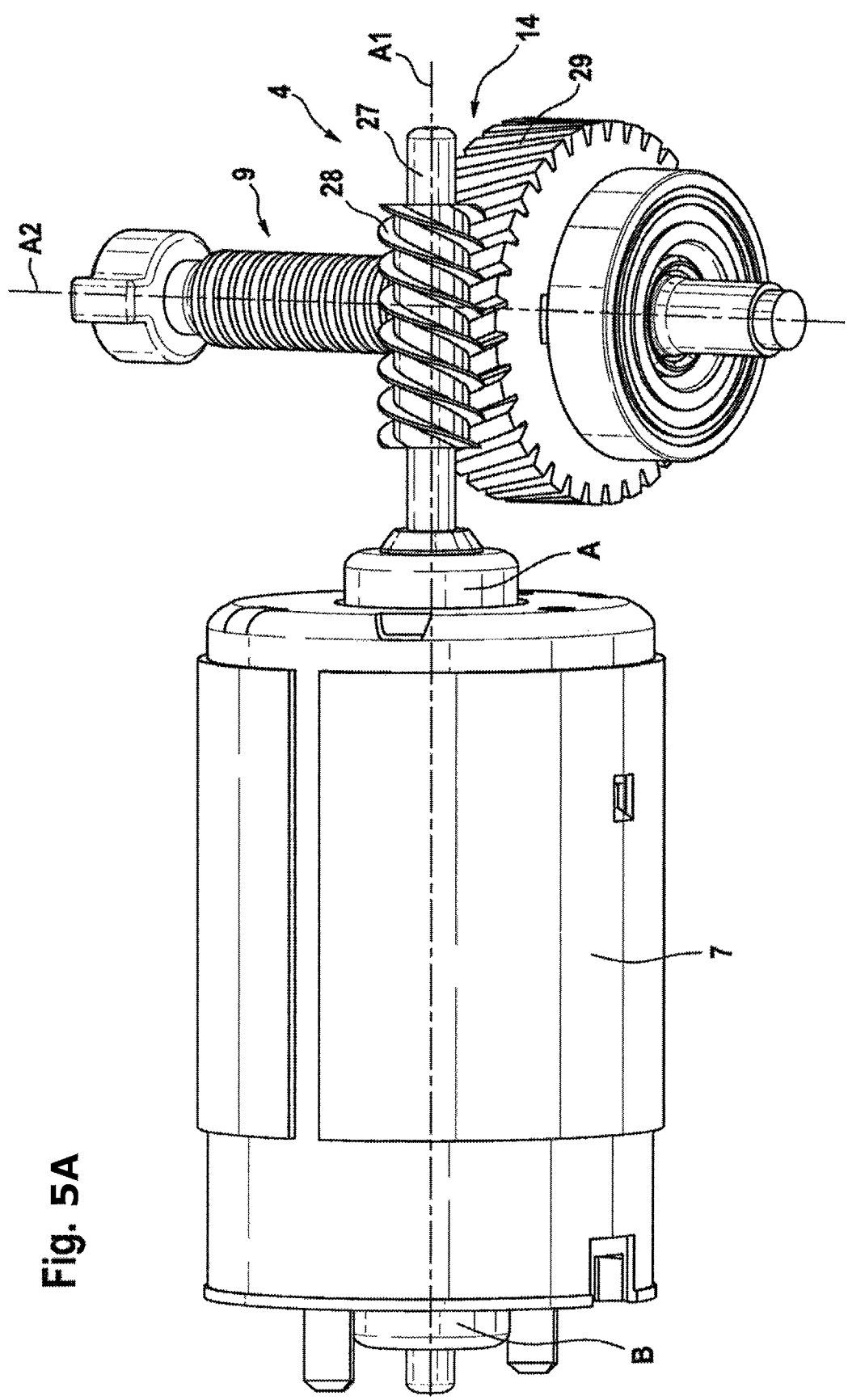

As can be seen in particular from FIGS. 3+6, the gearing housing 8 is formed in a particularly rational manner in 2 parts, from a trough-like gearing housing lower shell 8a with an interface for the rotationally fixed arrangement on the anchor plate 2 and with a gearing housing cover 8b with a uniform parting plane TE, which is arranged so as to be directed parallel to the axis A1 and orthogonally with respect to the axis A2. Here, the gearing housing lower shell 8a of the gearing housing 8 forms, for the purposes of receiving the motor 7, an integral motor receptacle with electrical interface (preferably 2-pole socket) 50, and wherein the motor housing is accommodated both rotationally fixedly and in a transverse force direction in the gearing housing 8. Here, the motor receptacle forms, for sealing purposes, an independent, separate, sealed-off installation space in the gearing housing 8, such that the motor interior, bearings, commutator or similar components cannot be contaminated or damaged by foreign media such as for example spray water, oil, grease or particles. At a right angle with respect to the motor receptacle, that is to say oriented orthogonally with respect to the motor dome 36 in a V-shaped cranked manner, there extends a gearing dome 37 which serves for the rotationally fixed mounting of the spindle, which is displaceable in translational fashion, of the spindle arrangement 9 by means of a guide 19, and wherein the axes A1, A2 are substantially at right angles. Here, it is expedient if the gearing dome 37 delimits, in the gearing housing 8, an independently separate installation space, which is sealed off against foreign media, for the spindle arrangement 9. It can be seen that the gearing dome 37 is designed primarily as a unipartite projection of the gearing housing cover 8b. Viewed together with FIGS. 2 and 4, it becomes clear that the interface arrangement is, in the overall context, such that all interfaces (electrical+hydraulic interface, in particular hydraulic pipeline and cabling, such as in particular parking brake actuator lines and sensor lines) are concentrated so as to be combined in a highly assembly-facilitating manner in a protected sector above the wheel axis of rotation D, for example at a 2 o'clock position of the anchor plate 2, whereby a facilitation of the installation process at the vehicle manufacturer can incidentally also be made possible.

Figure 9:
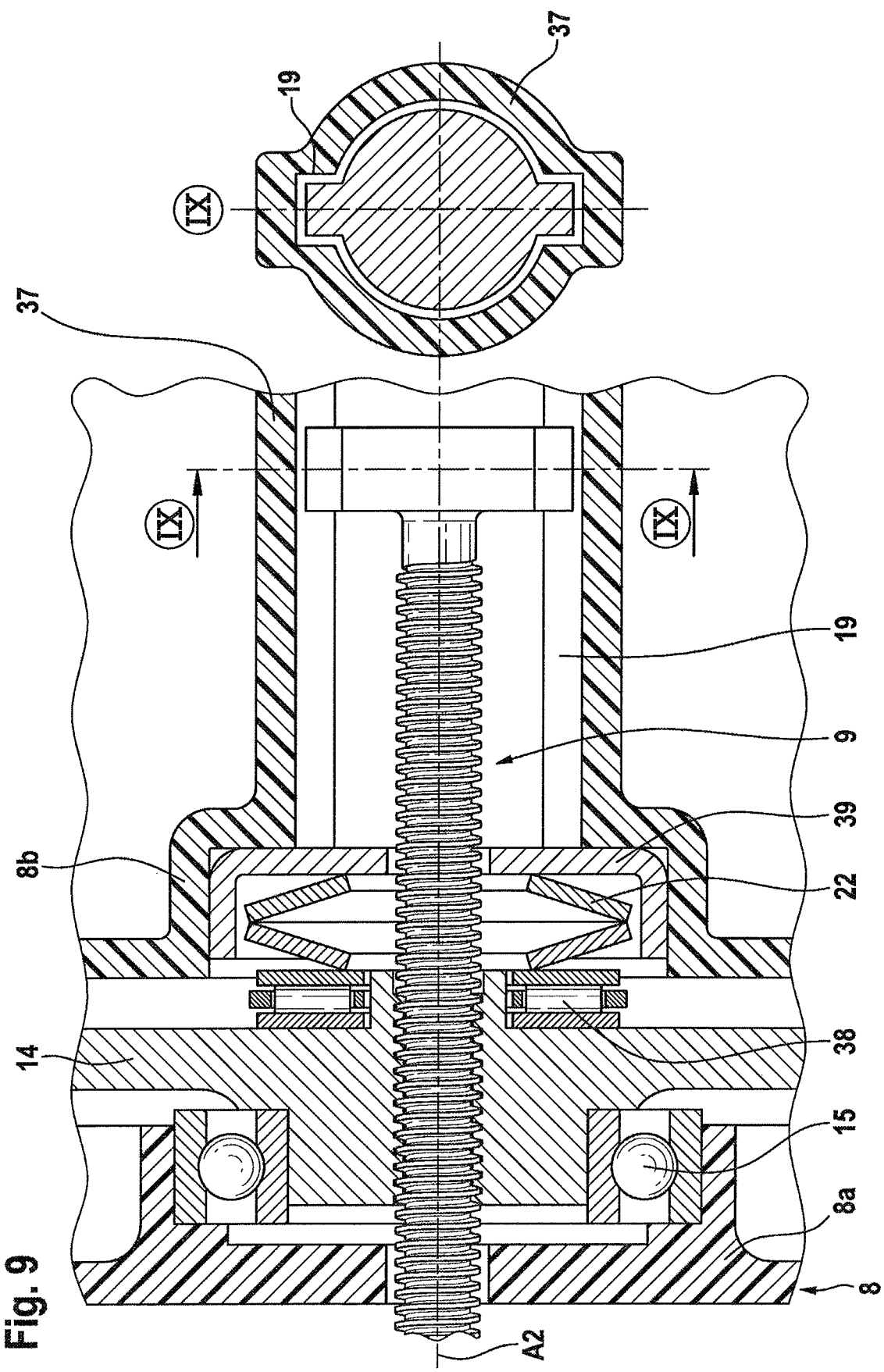
Figure 10:
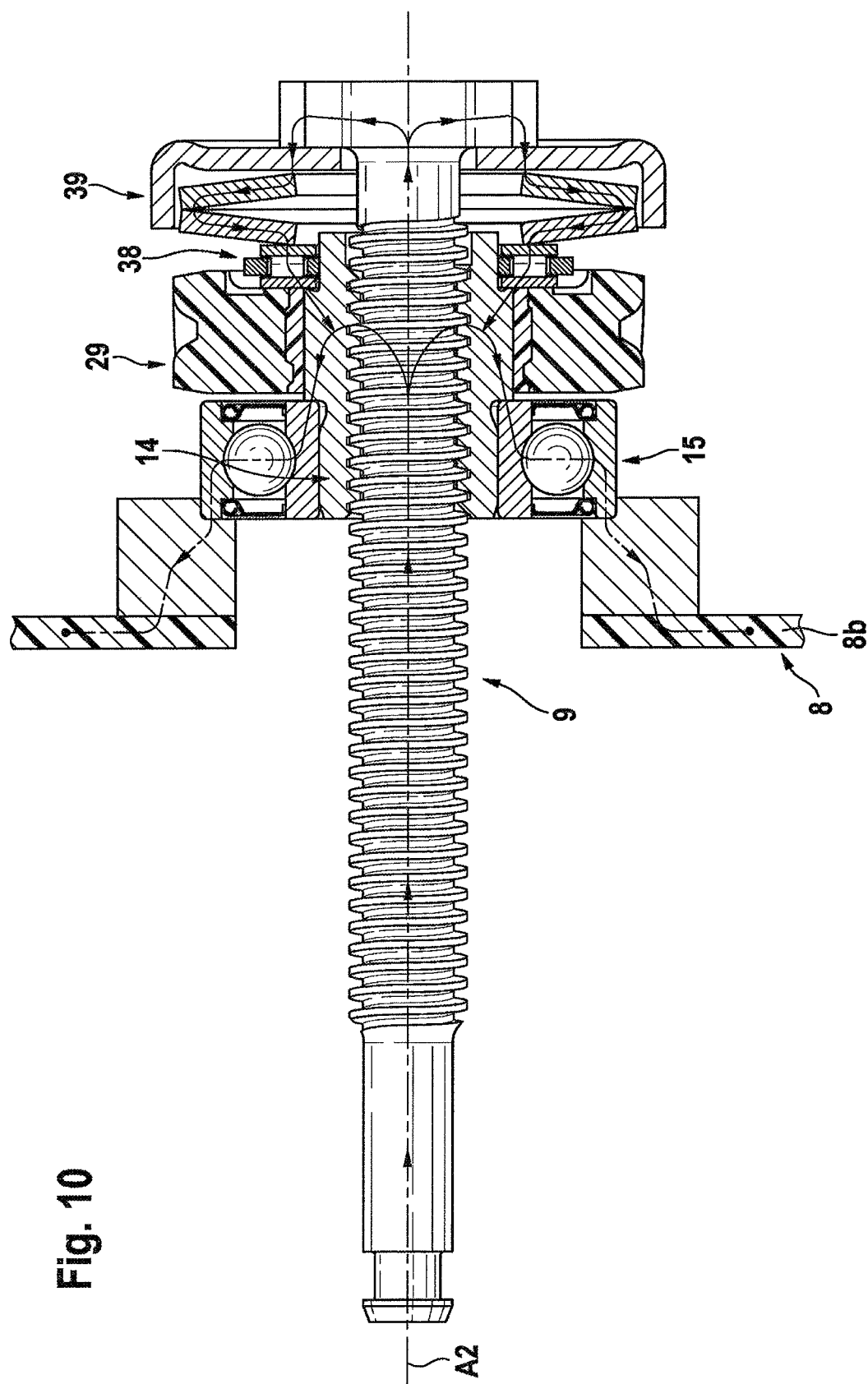
FIG. 10)

In a simplification with increased efficiency (reduced mechanical losses) and a high degree of running smoothness, the drive train comprises the single multi-wheel gearing stage, specifically helical-wheel gearing stage, which comprises only the helical-wheel pinion 28 and a helically toothed helical wheel 29 that meshes with said helical-wheel pinion. In the illustrated embodiment, the helical-wheel pinion 28 has a triple-start thread and is pressed rotationally fixedly onto the free motor shaft end 27 of the motor shaft. The mounting of the helical-wheel pinion 28 is cantilevered and is realized indirectly by means of the motor shaft mounting in the motor housing, such that radial forces and axial thrust force components resulting from the toothing during the brake application process are dissipated via helical-wheel meshing and motor shaft into two motor shaft bearings (A-bearing receptacle in fixed bearing form in the bearing shield of the brush holder plate, B-bearing receptacle in floating bearing form in the motor pot base, or vice versa) and ultimately into the gearing housing 8. The motor shaft mounting accordingly requires at least one rolling bearing that is capable of accommodating both radial and axial thrust forces. The mounting of the spindle arrangement 9 in the gearing housing 8 is performed by means of a bearing 15, specifically a combined rolling bearing, in particular deep-groove ball bearing, which is capable of transmitting axial forces and radial forces into the gearing housing 8, in particular the gearing housing lower shell 8*a*. The combined rolling bearing is received and fixed by means of its bearing outer ring in a seat in a receptacle of the gearing housing 8. For this purpose, the helically toothed helical wheel 29 is preferably composed of plastic and connected rotationally conjointly to the metallic drive nut 14 (FIG. 8), or is alternatively formed metallically in one piece with said drive nut (FIG. 9). A bearing journal serves for the axially fixed, common rotational mounting of helical wheel with drive nut 14 in the gearing housing 8, which bearing journal bears the combined rolling bearing such that both the radial force components and the axially directed thrust force components that result from the helical toothing are introduced into the gearing housing 8.

Figure 6:
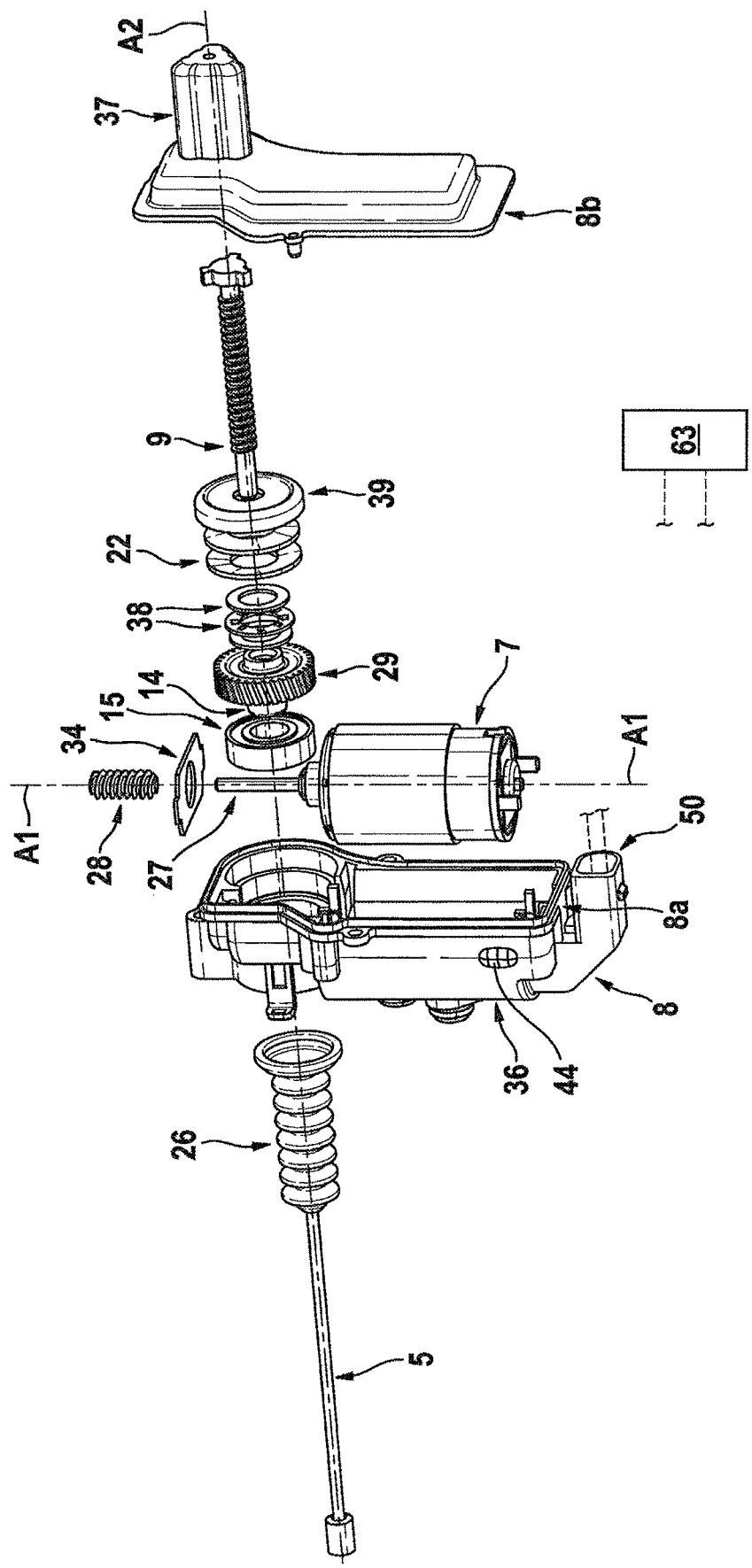
FIG. 6 shows an exploded drawing of the parking brake actuator arrangement, approximately to scale, FIGS. 7+8 show enlarged illustrations of the major components of a spindle arrangement in an exploded/preassembled state, FIGS. 9+10 show the mounting of the components of the spindle assembly from FIGS. 7+8 in the gearing housing, in each case in an actuated/released position, in part with the force flow being illustrated (cf.
Figure 7:
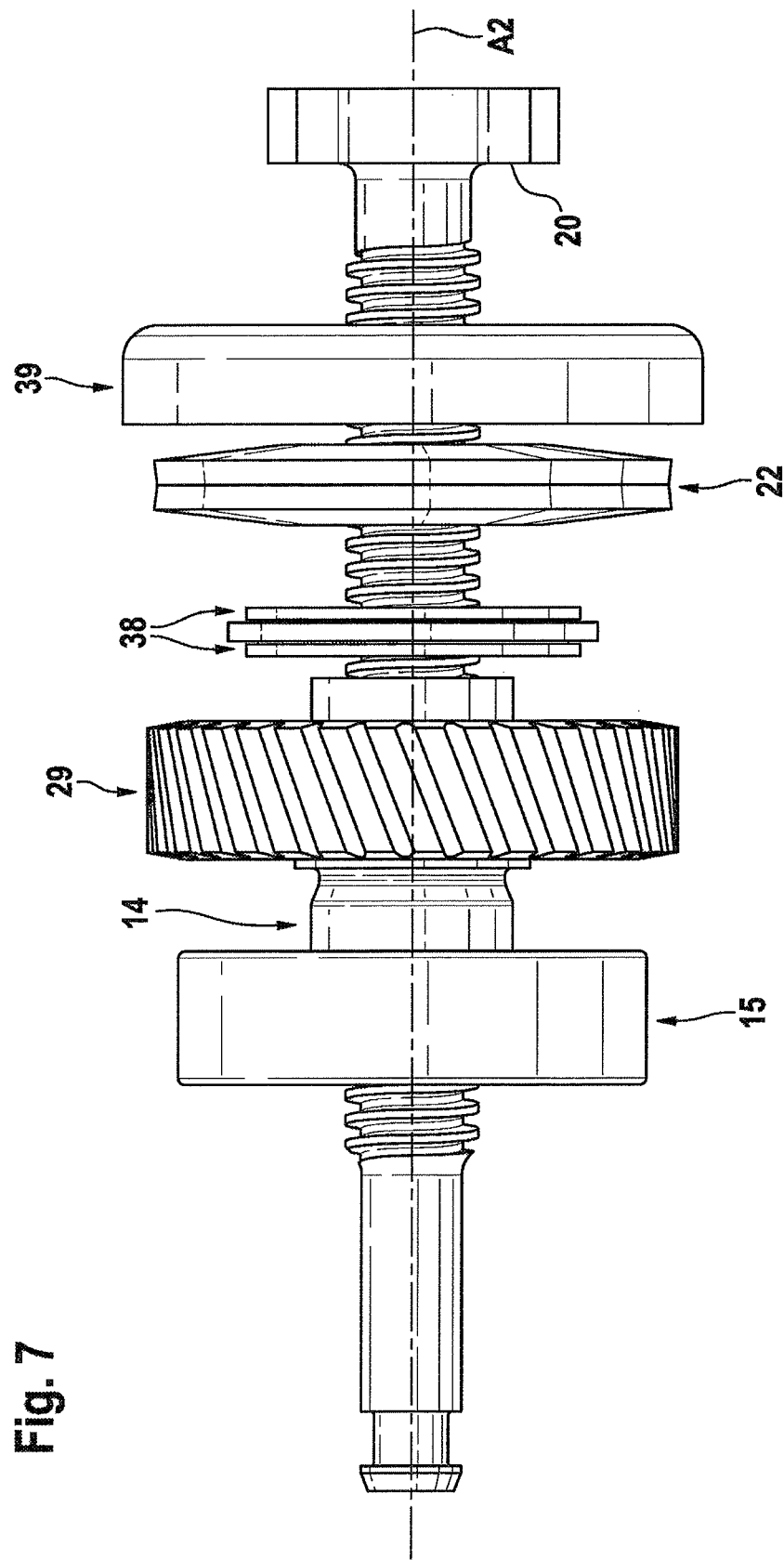
Figure 8:
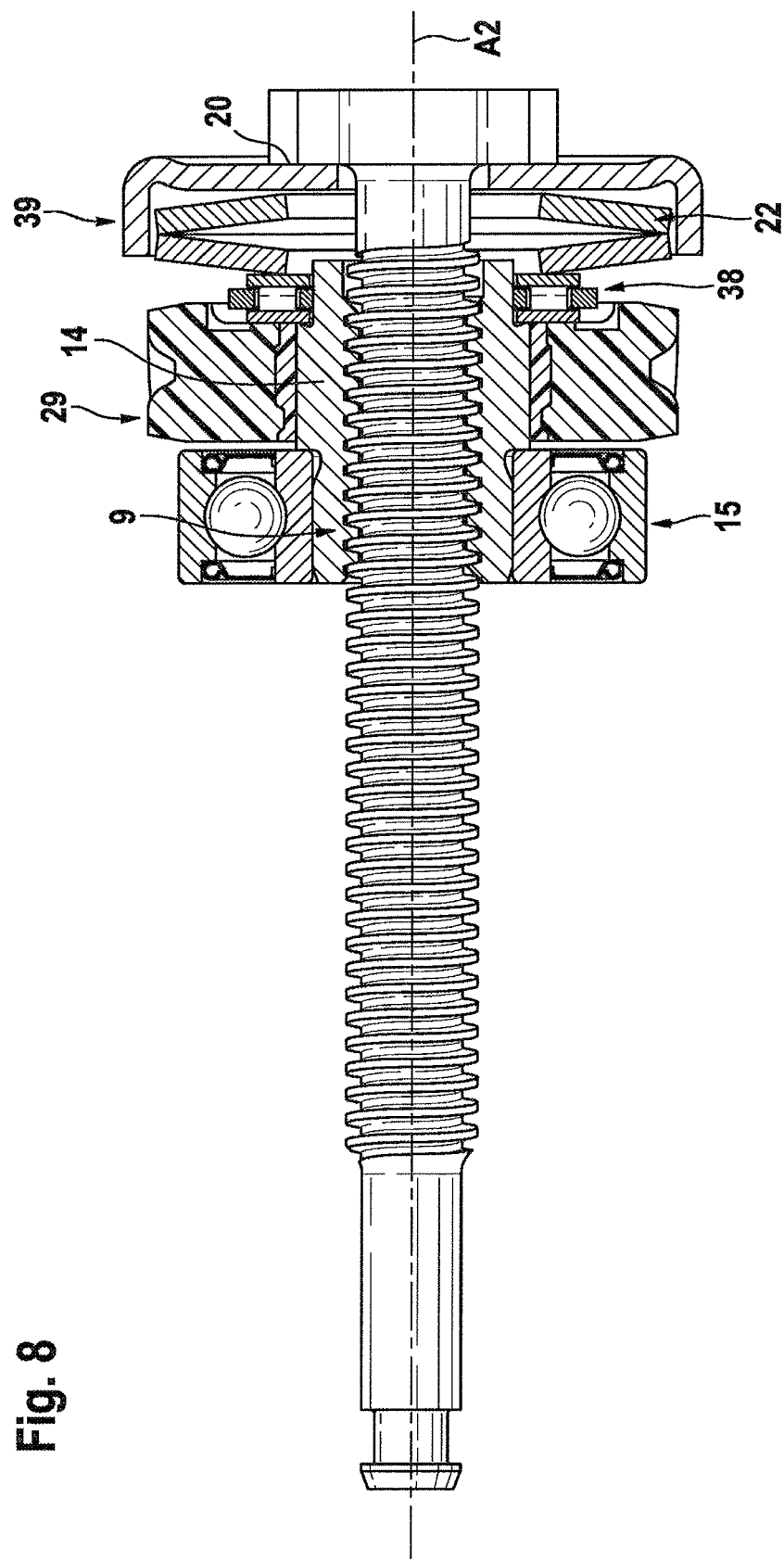

The process of the modular final assembly of subassemblies and components emerges particularly clearly from FIG. 6. This comprises, in its assembly sequence, the following steps+subassemblies:

1.) Providing and fixing the gearing housing 8 with trough-like housing lower shell 8*a* including anchor plate interfaces, gearing housing cover centering means, motor dome 36 with bulkhead and (pneumatically acting, water-tight) pressure equalization device in the form of a diaphragm 44, and electrical interface 50;

2.) Inserting the motor 7 including electrical contacts and helical-wheel pinion 28, fixed to a shaft, into the gearing housing lower shell 8*a*;

3.) Producing electrical contacting between the electrical interface 50 and motor contacts (by soldering, welding, crimping, insulation displacement of contact tabs)

4.) Inserting the spindle arrangement 9 with actuation cable 5, spindle, drive nut 14, axial bearing 38 and elastic element 22 into the gearing housing lower shell 8*a*. Pairing helical-wheel pinion 28 and helical wheel 29;

5.) Aligning, placing on and fixing the gearing housing cover 8*b* with one or more gearing housing cover centring means and gearing dome 37 on the gearing housing lower shell 8*a*, wherein the parting plane TE (gearing housing parting) is directed orthogonally with respect to the axis A2.

FIGS. 6-9 relate to a hardware configuration for improved electrical closed-loop control of a parking brake system (for the purposes of sensorless detection of a rearward end stop free from brake application forces). FIGS. 6-9 illustrate an improved spindle assembly 9, which is designed with self-locking action, using an elastic element 22 for the sensorless, improved detection of the released state (release position free from brake application forces). Here, furthermore, improved assembly formation with space-saving mounting of the elastic element 22 in a receptacle 39 is made possible. The elastic element 22 is provided in clamped fashion between spindle and drive nut 14, such that the force flow through elastic element 22, spindle and drive nut 14 is self-contained without involving the gearing housing 8. The elastic element 22 is thus also a preassemblable constituent part of the spindle assembly. In this way, a closed force flow is present such that the forces exerted on the elastic element 22 by the spindle arrangement 9 are supported indirectly or directly by the rolling bearing in the gearing housing 8. Accordingly, a separate counterbearing with a stop in the gearing housing 8 is omitted. In the embodiment, the force flow passes via spindle, elastic element 22, axial bearing (disk) 38, drive nut 14, bearing 15 (rolling bearing) and gearing housing 8 into the anchor plate 2. Furthermore, by means of this novel force flow guidance, it is made possible for the elastic element 22, together with axial bearing 38, drive nut 14 and the receptacle 39 of the elastic element 22, to be provided as a constituent part, preassembled in the form of a structural group, of the spindle arrangement 9. Alternatively, the rolling bearing may be provided in fully preassembled form in the gearing housing 8, and the preassembled spindle assembly 9 is inserted into the bearing inner ring of the rolling bearing. It is furthermore alternatively possible for the rolling bearing to the of split form, and wherein the rolling bearing outer ring is present in preassembled form in the gearing housing 8, whereas the rolling bearing inner ring with rolling bodies and preferably with a rolling body cage constitutes a preassembled constituent part of the spindle arrangement 9. In any case, the spindle arrangement 9 together with elastic element 22 is mounted and centered in the gearing housing 8 by means of the rolling bearing outer ring. The elastic element 22 may be assigned the receptacle 39 as a centring and assembly aid, which is a constituent part of the spindle assembly 9. The above novel definition of centrally pre-assemblable key components with a greatly reduced number of components and parts predestines the parking brake actuator 3 for inexpensive final assembly, which is nevertheless easily scalable in terms of quantities, both in conjunction with manually manufactured small batches and in conjunction with robot-compatible mass assembly.

It should be added that the elastic element 22 may also comprise an interconnection of multiple individual springs which may be joined together and/or elastically prestressed by means of an assembly aid as an encapsulation, bracket arrangement, by means of a cage or other grouping measure. For the purposes of saving structural space, the use of plate springs is therefore recommended.

Figure 11:
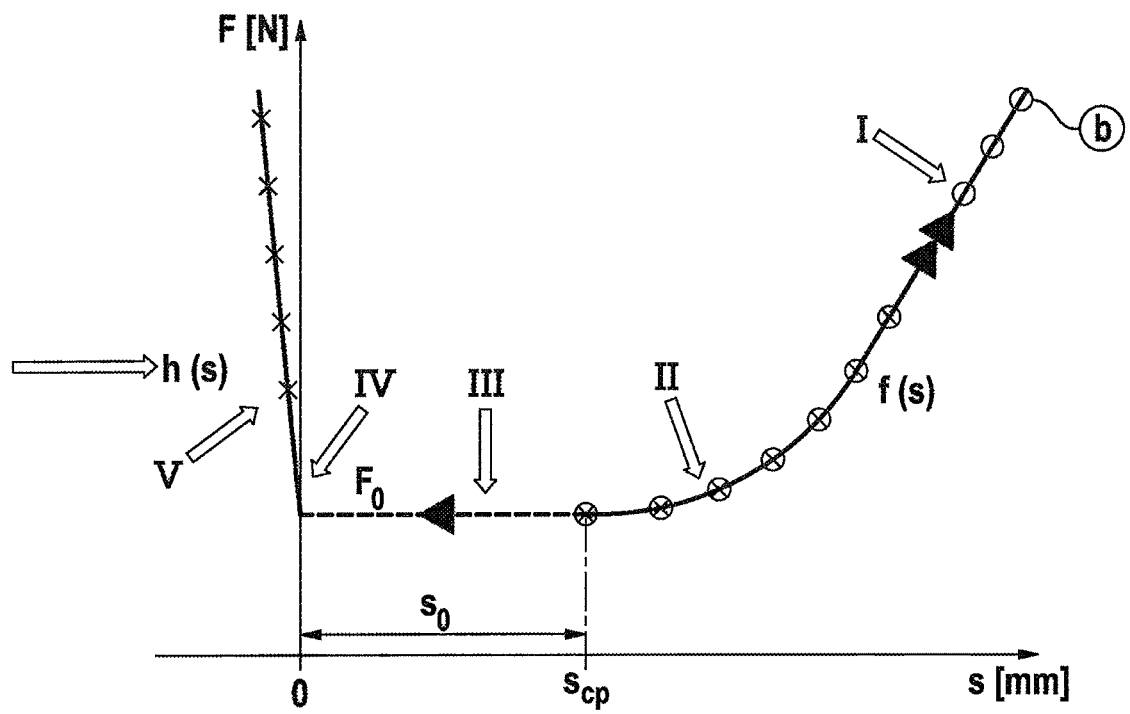
FIG. 11 shows idealized, modelled relationships between force (F) versus an actuation travel s, in relation to the spindle of the parking brake actuator.
Figure 12:
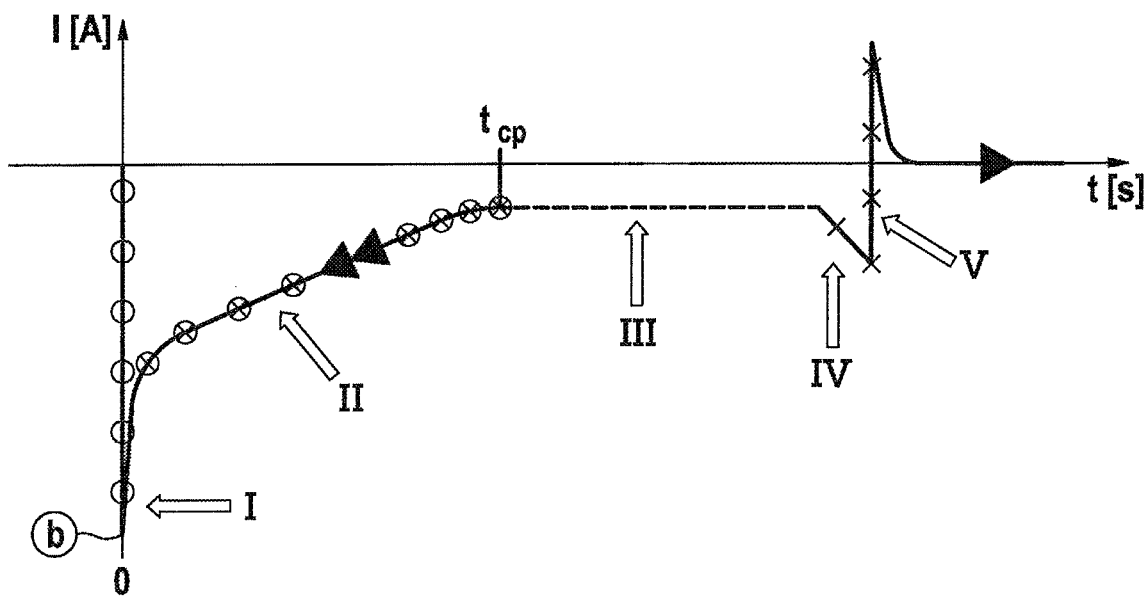
FIG. 12 shows, in idealized, modelled form, the stage sequence I-V of the detected current demand I versus the time t, for the purpose of illustrating, when viewed together with FIG. 11, a method for the sensorless detection of a rearward parking brake actuator end stop free from brake application forces.

Further aspects are illustrated on the basis of FIGS. 11+12 and relate to an operating method for an electric parking brake actuator 3. In the respectively modeled, idealized characteristic curve profiles, an electromechanical brake application process is indicated using a double arrow, while an electromechanical release process in the opposite direction is symbolised by a single arrow. In this context, the spindle of the parking brake actuator 3 is free from tensile forces in the characteristic curve sections denoted by dashed lines (red) or by crosses (green). The elastic element 22 is effective exclusively in the characteristic curve region marked with crosses (green). Accordingly, the elastic element 22 is effective, in a manner dependent on the actuation travel s covered, as an end stop which is incorporated elastically into the force flow of the bearing forces, with the result that a change in characteristic curve, which can be detected in sensorless fashion, is present in the electrical current-time profile, which change is processed and evaluated by the control unit 53 by observation of the electrical current profile. This is brought about in particular by virtue of the fact that the spindle is increasingly acted on by the elastic element 22 at the start of the phase IV and in the phase V. Another characteristic curve range, respectively marked by circles in FIGS. 11+12, relates, by contrast, to the actuation range, subjected to tensile force, of the parking brake actuator arrangement. A release process is therefore very basically divided into the following process phases, in each case starting from the actuation state b and viewed in the release direction.

Phase I: Motor start-up in the release direction (start of electrical energization)

Phase II: Depletion of force in the release direction

Phase III: Idle operation in the release direction
Phase V: End of action (end of electrical energization)

It is self-evident that a brake application process occurs in the precisely opposite manner.

FIG. 11 shows a (tension) force profile F versus the parking brake actuator actuation travel s. Here, a characteristic curve branch f(s) in principle shows a force-related relationship between the spindle and actuation cable, that is to say the branch of the application of tensile force between spindle and actuation cable 5. This characteristic curve branch is marked by dashed lines (red) in the travel interval of the idle travel (free from tension force) and by circles (blue) in the travel interval with tension force loading. Conversely, a characteristic curve branch h(s), which lies on the other side of the 0 point and is also marked with crosses (green), illustrates a force action of the elastic element 22 with respect to the spindle. This force action occurs only in an interval between the traversing of the 0 point and the attainment of the rear end stop. This force action of the elastic element 22 is directed counter to the release movement of the spindle.

As is clear in detail from FIG. 11, during the brake application, the parking brake actuator unit overcomes an idle travel s0 in a manner substantially free from forces (F0) with the phase III, in accordance with the characteristic curve part indicated by dashed lines (red). When the travel mark scp is reached, actuation force (tensile force) is built up in the phase II. The electronic control unit 53 serves for the closed-loop control, in particular for the activation and deactivation of the electrical energization. Both during the brake application and during the release by the parking brake actuator, the electrical current profile is observed by the control unit 53 in order to detect whether, on the one hand, the required brake application force has been reached or, on the other hand, the release state has been reliably attained, before the electrical energization of the parking brake actuator is ended.

The control unit 53 comprises a microprocessor with a memory and, in accordance with an EDP-supported and software-based cyclically performed closed-loop control routine on the basis of a physical system model stored in software-based fashion, assumes that the drum brake system has been reliably transferred into the release position whenever the brake shoes 6a,b have reached their release position free from brake application forces. This is reached when the brake shoes 6a,b are still just lying under the action of the prestressed spring elements 51, that is to say in a manner free from brake application forces, but nevertheless in a defined manner, on the support device 11. Therefore, in accordance with the stated model, the control unit 53 detects the phase V after the phase III, that is to say the idle level free from brake application forces, is overcome, and the phase IV has also been concluded. Accordingly, it is monitored and correspondingly detected whether the power demand of the parking brake actuator increases in response to the end of the phase IV in a marked and reproducibly ensured manner. In other words, use is made of the special feature that, when the parking brake actuator 3 moves into its "rear", reliably released end position—that is to say the release position on the other side of the 0 point—a linearly or progressively rising significant change in the profile of the electrical current-time characteristic curve occurs as a result of elastic deformation of the elastic element 22. This fact is automatically monitored and detected by the control unit 53 through characteristic curve observation. After the detection, the electrical current supply to the parking brake actuator 3 is automatically deactivated by the control unit 53, without inertial effects in the drive train of the parking brake actuator 3 being able to generate any comfort-impairing effects (follow-on running). After deactivation of the electrical energization, the drive train of the parking brake actuator 3 comes to rest instantaneously owing to self-locking in the release position that has been attained.

Figure 13:
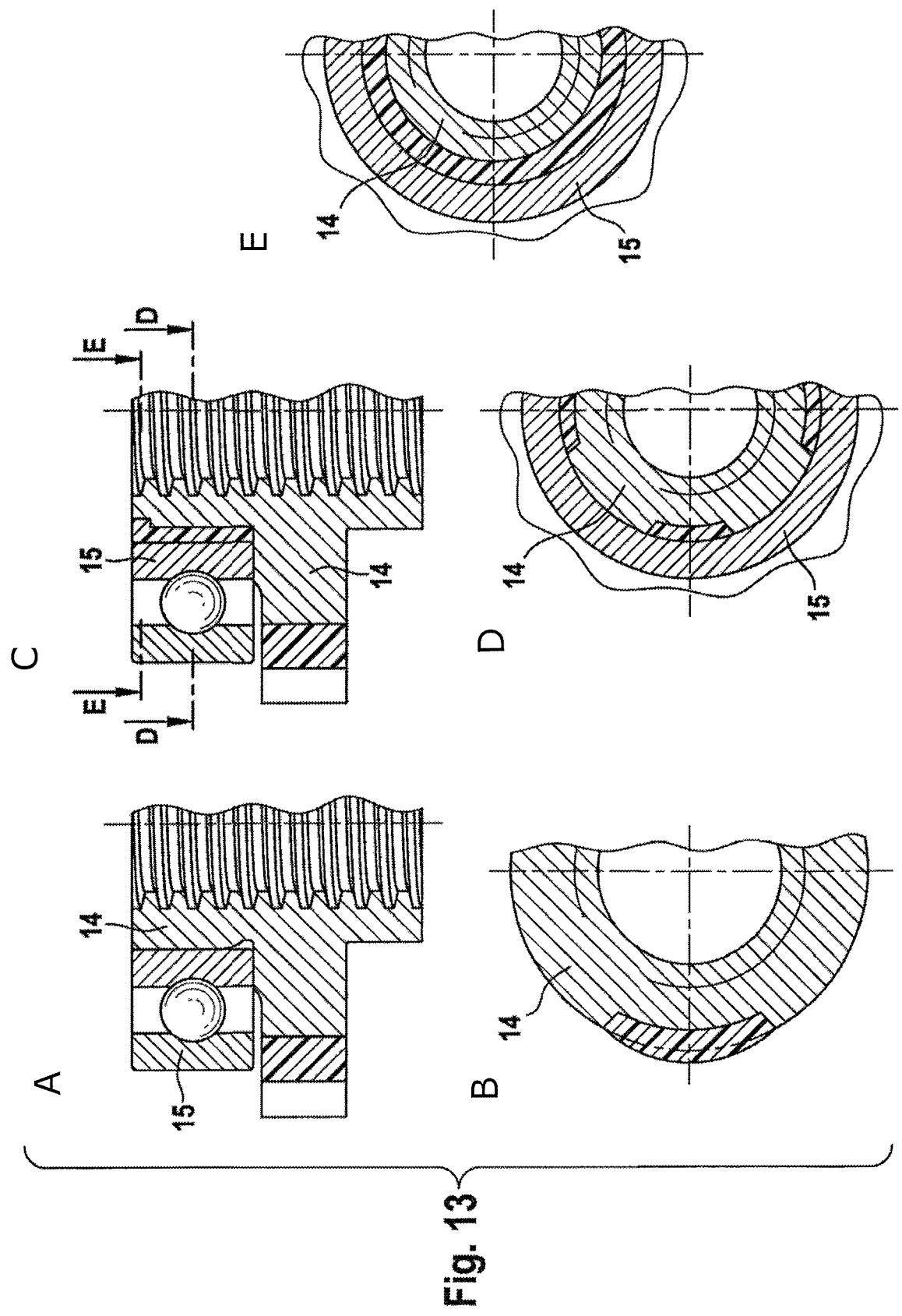
FIGS. 13A-13E show the details of the improved, self-aligning rolling-bearing-type mounting, in particular for use for motor shaft mountings, gearing shaft mountings or drive nut mountings, which are acted on by transverse forces, of electromechanically driven parking brake actuators.

Essential aspect emerge from FIG. 13, wherein FIG. 13 A illustrates a conventional bearing design. Special measures in the region of a specially designed bearing seat for effective equalization and/or self-centering under high actuator forces with simultaneously adequate linear guidance quality emerge from FIG. 13 13 B-FIG. 13 E on the basis of the correspondingly illustrated drive nut 14 with mounted rolling bearing 15. In principle, the drive nut 14 can be manufactured entirely from metal material. It is however also possible for the drive nut 14 to form a metallic carrier body for a rolling bearing ring and a toothed ring, and wherein the toothed ring, composed of plastics material, is fitted rotationally conjointly onto the metallic carrier body. In this respect, a certain elasticity can already be formed between toothed ring and carrier body. In this context, a bearing journal on the drive nut (or carrier body) or accordingly a bearing bore in a gearing housing 8 (which may likewise act as a carrier body for an associated rolling bearing ring) may, with simplification of the manufacturing process, have a specially formed, quasi-elastic bearing seat which furthermore tolerates and compensates misplacement, inaccuracy, elastic deformation and angle errors between the paired components. In this context, the combined rolling bearing design presented by way of example in the drawing is proposed. The co-rotating bearing inner ring of the combined rolling bearing receives circumferential load from the helical toothing of the helical-wheel gearing. The rotationally fixed bearing outer ring of the combined rolling bearing has a point load imparted thereto by the rolling bodies. In one solution to the problem, it is provided that the metallic bearing inner ring is not simply seated directly and metallically rigidly on a highly accurately manufactured bearing journal of the cylindrically ground bearing seat of the drive nut 14. Rather, the bearing seat is provided with defined elasticity, which permits at least slight elasticity, that is to say flexibility. In the embodiment as per FIG. 13 E, the carrier body is therefore equipped with a tubularly continuously extending, cylindrically encircling, elastic, non-metallic lining specifically of the intermediate layer, which bears the rolling bearing inner ring. The intermediate layer is basically connected rotationally fixedly to the respective carrier body. Here, the intermediate layer may have integrally formed drivers which act in positively locking fashion on the carrier body. The drivers may be provided as a special profiling. From the embodiment as per FIG. 13 C, it is possible to see a driver which is formed on the axially outer end as a partially step-like thickened shoulder of the intermediate layer, and which points radially inward.

In the embodiment as per FIG. 13 C and FIG. 13 D, the bearing seat on the bearing journal is formed, by way of example, as a carrier body which comprises a partially differently flexible intermediate layer using a profiling and a quasi-elastic intermediate layer composed of non-metallic material. For this purpose, the carrier body may comprise a profile, such as in particular a spline toothing, groove arrangement or similarly positively locking working surface design with projections and cavities, and wherein the cavities are lined, with a radial oversize, with the material of the quasi-elastic intermediate layer. The local oversize can be seen from FIG. 13 B. The intermediate layer may be formed from thermoplastic material which is applied to the carrier body, in particular by injection molding. Altogether, it is also possible for metallic residual supports to remain in an evenly distributed manner on the bearing seat circumference, which metallic residual supports are dimensioned such that alternately offset zones with an interference fit (in the region of the quasi-elastic intermediate layer) and zones with a metallic clearance or transition fit are realized. In summary, by means of the quasi-elastic bearing inner ring support, it is possible in principle to dispense with cumbersome external machining by means of a cylindrical grinding process on the bearing journal, and also to dispense with the manufacture of a special bearing undercut at the transition to the drive nut 14. A corresponding situation basically applies with regard to the omission of even more cumbersome internal machining, as far as a rolling bearing seat that must be formed into a bearing bore is concerned. Accordingly, the manufacturing costs for this usage example, too, are lowered. The described compensation characteristic furthermore permits noise-deadened and comfortable system operation, and wherein a demand for accuracy in the toothing manufacturing process can additionally be lowered.

LIST OF REFERENCE DESIGNATIONS

1 Drum brake module
2 Anchor plate
3 Parking brake actuator
4 Gearing
5 Actuation cable
6 Brake shoe
7 Motor
8 Gearing housing
9 Spindle arrangement
10 Adapter
11 Support device
12 Outer side
13 Inner side
14 Drive nut
15 Bearing
16 Contact area
17 Guide
18 Sheath
19 Guide
20 Stop
21 Counterbearing
22 Elastic element
23 Connector
24 Passage opening
25 Outlet opening
26 Seal element
27 Free motor shaft end
28 Helical wheel pinion
29 Helical wheel
30 Fastening means
31 Rotation prevention means
32 Projection
33 Recess
34 Centering frame
35 Support block
36 Motor dome
37 Gearing dome
38 Axial bearing
39 Receptacle
40 Lever arm
41 Emergency bearing
42 Motor shaft receptacle
43 Lubricant reservoir
44 Diaphragm
50 Interface
51 Spring element
52 Wheel brake cylinder
53 Control unit
A1,A2 Axis
ax Axial
B Actuation direction
b Actuation state
D Axis of rotation
F (Tension) force
I Electrical current (demand)
R Three-dimensional curve
r Radial
s Travel
t Time
TE Parting plane
Ü Projecting length
X Axis spacing
I,II,II,IV,V Process phases

The invention claimed is:

1. An electric drum brake system with a parking brake actuator for a motor vehicle, wherein the parking brake actuator is arranged on an outer side of an anchor plate and, in a state of rotational drive, drives a drive nut which is supported rotatably and axially fixedly on the anchor plate, which drive nut drives a spindle, which is mounted in a rotationally secured and axially displaceable manner in a gearing housing, of a spindle arrangement, which spindle engages by an actuation cable on at least one brake shoe such that the latter can perform an actuation movement in a direction of a brake drum or can perform a release movement in an opposite direction, and having at least one electrical interface for an electrical human-machine interface and/or for an electronic control unit, wherein an axis A1 along a motor shaft of the motor with a helical wheel pinion coupled rotationally conjointly to the free motor shaft end and an axis A2 of the spindle arrangement including helical wheel coupled rotationally conjointly to the drive nut are arranged approximately at right angles with respect to one another and, with an axis spacing X with respect to one another, define a helical-wheel gearing stage of the parking brake actuator, and wherein the gearing housing comprises a gearing housing lower shell and a gearing housing cover, the gearing housing lower shell formed from a continuous piece which (i) includes the at least one electrical interface; (ii) accommodates the motor, motor shaft, and spindle arrangement; and (iii) defines the axis spacing X between axis A1 and axis A2.

2. The electric drum brake system with the parking brake actuator for a motor vehicle as claimed in claim 1, wherein the axis A1 is oriented vertically and perpendicularly with respect to a wheel axis of rotation D.

3. The electric drum brake system with the parking brake actuator for a motor vehicle as claimed in claim 1, wherein the axis A2 is oriented in a skewed manner with respect to the wheel axis of rotation D and in a skewed manner with respect to the anchor plate, and wherein the actuation cable is diverted in a curved fashion along a three-dimensional curve R at least on the inner side of the anchor plate and is otherwise arranged so as to be led substantially horizontally.

4. The electric drum brake system with the parking brake actuator for a motor vehicle as claimed in claim 1, wherein all interfaces relating to at least a hydraulic supply and electrical cables, for the drum brake are arranged in a bundled fashion within one semicircular sector, which is arranged above the wheel axis of rotation D, of the anchor plate.

5. The electric drum brake system with the parking brake actuator for a motor vehicle as claimed in claim 1, wherein the parking brake actuator comprises a single multi-wheel gearing stage.

6. The electric drum brake system with the parking brake actuator for a motor vehicle as claimed in claim 1, wherein the parking brake actuator comprises a cantilevered mounting of the helical wheel pinion based on the motor shaft mounting in the gearing housing.

7. The electric drum brake system with the parking brake actuator for a motor vehicle as claimed in claim 6, wherein the motor shaft mounting comprises at least one rolling bearing which accommodates both radial and axial thrust forces.

8. The electric drum brake system with the parking brake actuator for a motor vehicle as claimed in claim 1, wherein the motor shaft mounting and the mounting of the spindle arrangement in the gearing housing comprise at least two rolling bearings in a fixed bearing arrangement, which transmit both axial forces and radial forces.

9. The electric drum brake system with the parking brake actuator for a motor vehicle as claimed in claim 8, wherein at least one rolling bearing is received and fixed with a bearing outer ring in a seat in a receptacle of a lower shell of the gearing housing, such that radial force components and axially directed thrust force components from the tooth meshing are introduced directly into the lower shell.

10. The electric drum brake system with parking brake actuator for a motor vehicle as claimed in claim 1, wherein at least one rotation prevention means is provided between the motor and the gearing housing.

11. The electric drum brake system with parking brake actuator for a motor vehicle as claimed in claim 10, wherein a positively locking rotation prevention means comprises at least one projection on the gearing housing, the at least one projection engages into an associated recess of the motor.

12. The electric drum brake system with parking brake actuator for a motor vehicle as claimed in claim 1, wherein the motor is separately assigned, in the region of the helical-wheel gearing, a centering frame which is supported in the gearing housing.

13. The electric drum brake system with parking brake actuator for a motor vehicle as claimed in claim 1, wherein the free motor shaft end is assigned an emergency bearing in the gearing housing lower shell.

14. The electric drum brake system with parking brake actuator for a motor vehicle as claimed in claim 13, wherein the emergency bearing is formed, diametrically opposite a tooth meshing point of the helical-wheel gearing, from a plastics material as a unipartite motor shaft receptacle of the gearing housing lower shell.

15. The electric drum brake system with parking brake actuator for a motor vehicle as claimed in claim 14, wherein a lubricant reservoir is provided in the gearing housing lower shell in the region of the emergency bearing.

16. The electric drum brake system with parking brake actuator for a motor vehicle as claimed in claim 13, wherein a lubricant reservoir is provided in the gearing housing lower shell in the region of the emergency bearing.

* * * * *